United States Patent
Itogawa

(10) Patent No.: US 11,875,073 B2
(45) Date of Patent: Jan. 16, 2024

(54) PRINTING DEVICE WITH ACCUMULATION PRINTING

(71) Applicant: BROTHER KOGYO KABUSHIKI KAISHA, Nagoya (JP)

(72) Inventor: Yoshihiro Itogawa, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/045,925

(22) Filed: Oct. 12, 2022

(65) Prior Publication Data

US 2023/0139498 A1    May 4, 2023

(30) Foreign Application Priority Data

Oct. 29, 2021   (JP) .................................. 2021-178172

(51) Int. Cl.
*G06F 3/12*   (2006.01)
(52) U.S. Cl.
CPC .......... *G06F 3/1238* (2013.01); *G06F 3/1205* (2013.01); *G06F 3/1209* (2013.01); *G06F 3/1254* (2013.01)
(58) Field of Classification Search
CPC .... G06F 3/1238; G06F 3/1205; G06F 3/1209; G06F 3/1254
USPC ...................................................... 358/1.15
See application file for complete search history.

(56) References Cited

U.S. PATENT DOCUMENTS

| 11,020,997 | B2 * | 6/2021 | Kudo | B41J 29/13 |
| 2005/0276619 | A1 * | 12/2005 | Taguchi | G03G 15/0848 |
| | | | | 399/27 |
| 2013/0293929 | A1 * | 11/2013 | Kakutani | H04N 1/00082 |
| | | | | 358/3.24 |
| 2014/0139863 | A1 * | 5/2014 | Harada | H04N 1/4426 |
| | | | | 358/1.14 |
| 2019/0286376 | A1 * | 9/2019 | Fukuda | G06K 15/005 |
| 2021/0097360 | A1 * | 4/2021 | Sato | B41J 11/0024 |

FOREIGN PATENT DOCUMENTS

| EP | 1107104 A2 | 6/2001 |
| JP | 2001150761 A | 6/2001 |

* cited by examiner

*Primary Examiner* — Allen H Nguyen
(74) *Attorney, Agent, or Firm* — Scully, Scott, Murphy & Presser, P.C.

(57) ABSTRACT

A printing device includes a controller configured to receive print setting information, determine whether or not printing is set to accumulation printing, perform the printing, in a case where it is determined that the printing is not set to the accumulation printing, and perform a print preparation processing of performing a predetermined preparation operation before printing, in a case where it is determined that the printing is not set to the accumulation printing. The controller is configured to accumulate print job data without performing the print preparation processing, in a case where it is determined that the printing is set to the accumulation printing.

8 Claims, 11 Drawing Sheets

PRINTING DEVICE WITH ACCUMULATION PRINTING

REFERENCE TO RELATED APPLICATIONS

This application claims priority from Japanese Patent Application No. 2021-178172 filed on Oct. 29, 2021. The entire content of the priority application is incorporated herein by reference.

BACKGROUND ART

In a printing device, a technique has been proposed for shortening a first print out time (FPOT), which is a time from when a printing instruction is given until a first sheet is discharged from the printing device. For example, a related art provides a printing device in which the FPOT is shortened by spooling print data and performing a warm-up processing of the printing device in parallel. In the printing device of the related art, the warm-up processing is started by using start-up data received prior to the print data as a trigger.

DESCRIPTION

Here, there is a printing device capable of performing accumulation printing in which printing is not performed immediately after a print job is received, and printing of the print job is started in a case where information for permitting the printing of the print job is input. When the technique of the related art is applied to such a printing device, there is a problem that the warm-up processing is unnecessarily continued from the time when the print job is received until the printing is started, and thus a user feels uncomfortable and an energy saving performance deteriorates.

The present disclosure is made to solve the problem described above, and an object of the present disclosure is to provide a printing device that improves energy saving and user comfort.

In the present disclosure, a controller is configured to determine whether or not printing is set to accumulation printing, based on received print setting information. The accumulation printing is a printing method in which the controller is configured to store print job data in a printing device and to print the print job data stored in the printing device in response to receipt of a print instruction. The controller is configured to perform a print preparation processing of performing a predetermined preparation operation before printing, in a case where it is determined that the printing is not set to the accumulation printing. The controller is configured to accumulate the print job data without performing the print preparation processing, in a case where it is determined that the printing is set to the accumulation printing.

According to one aspect of the present disclosure, energy saving and user comfort can be improved.

Figure 3:
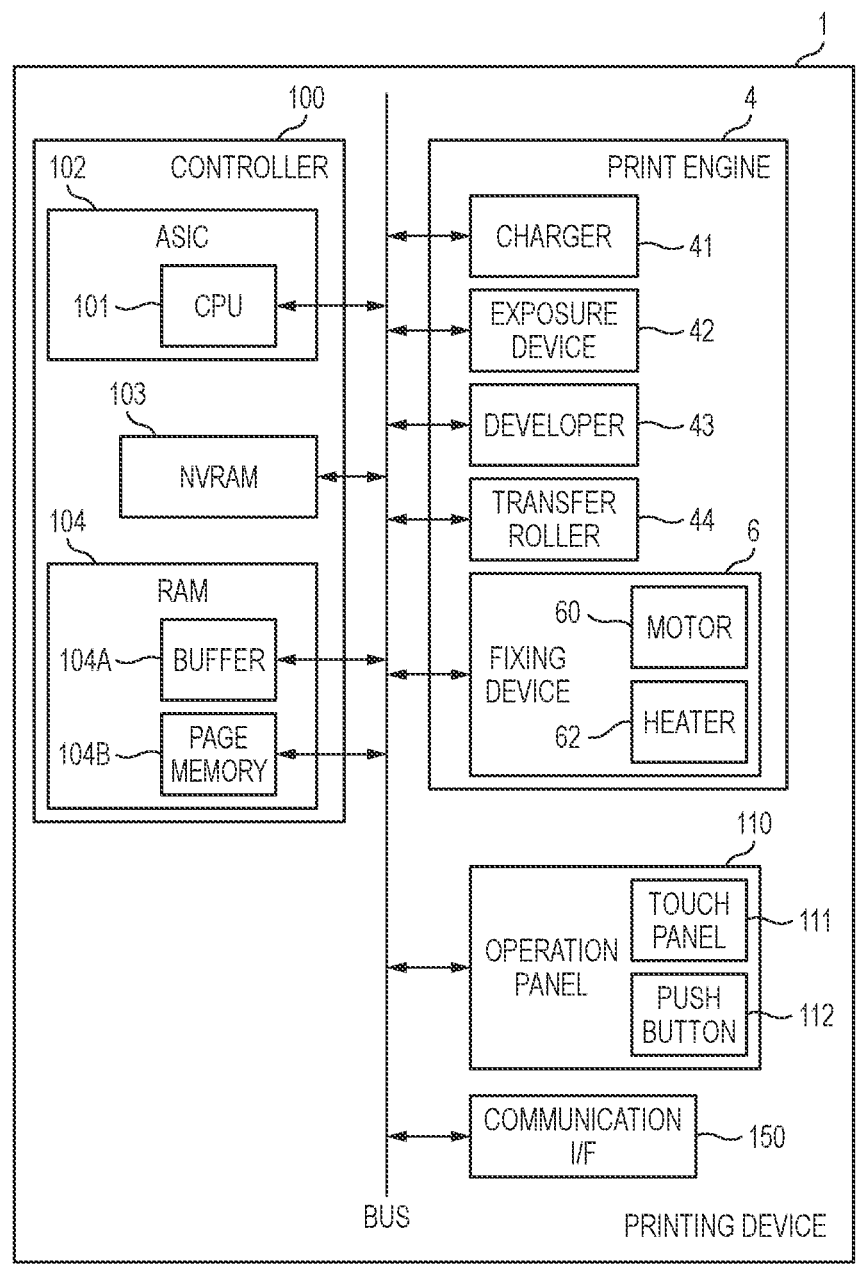
FIG. 3 is a block diagram showing an example of an electrical configuration of the printing device in FIG. 1.
Figure 10A:
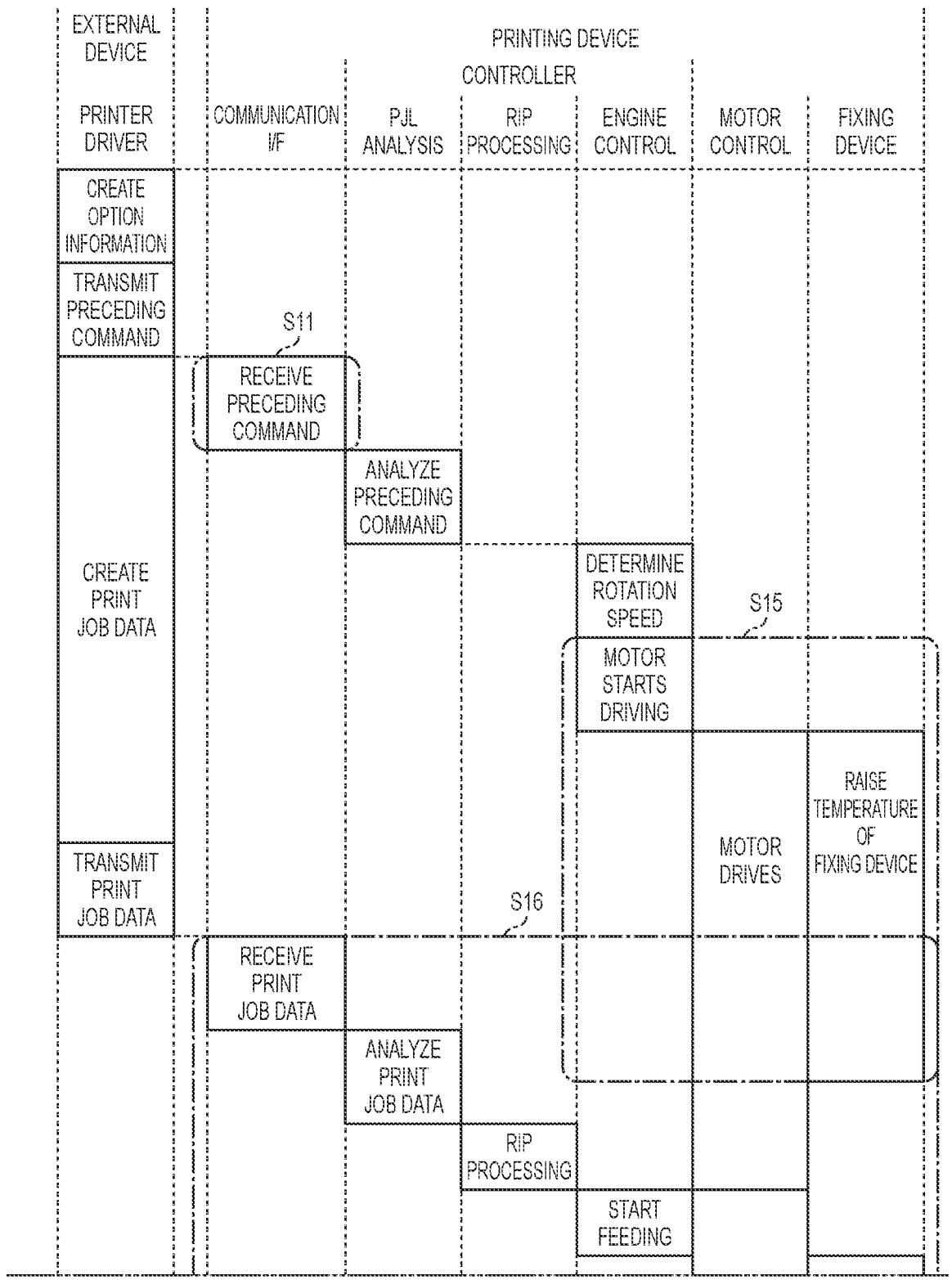
Figure 10B:
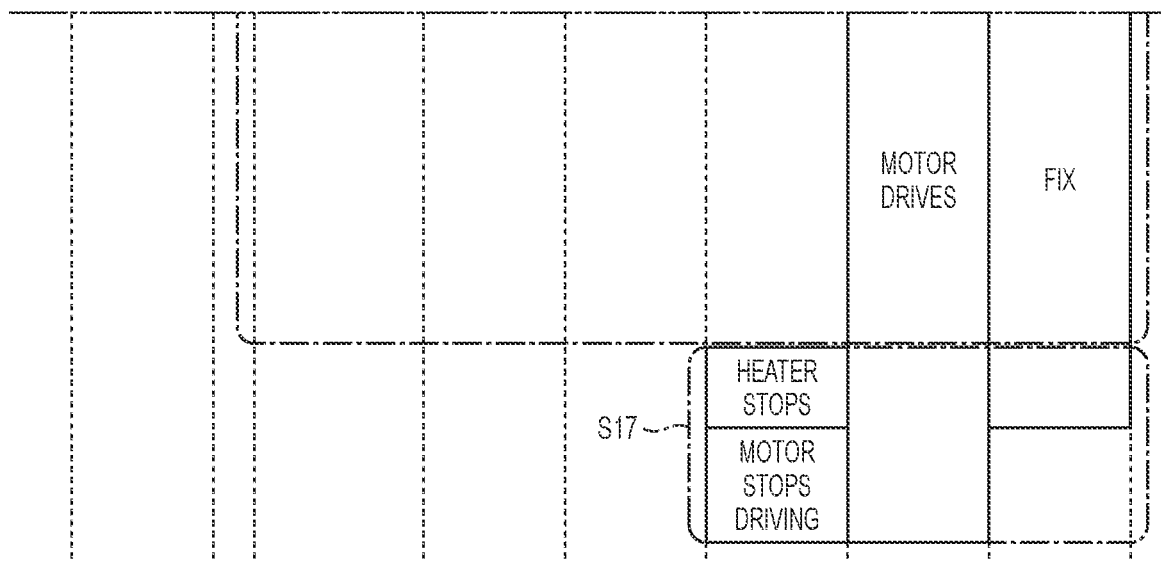

FIGS. 10A and 10B in combination are a timing chart showing an operation of each unit of the printing device in FIG. 3.

Figure 11:
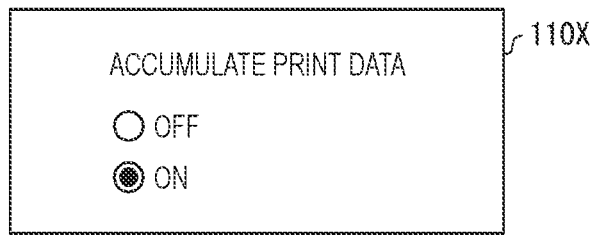

FIG. 11 is a diagram showing a display screen of a display when accumulation printing is set.

Figure 12:
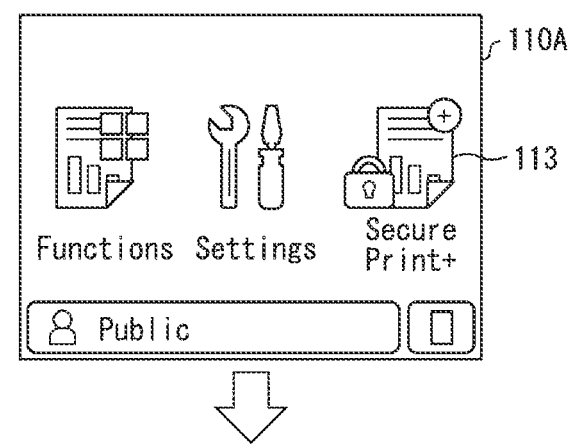
Figure 12:
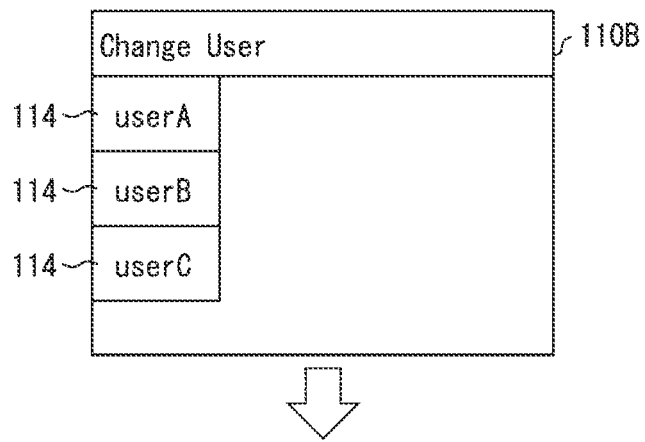
Figure 12:
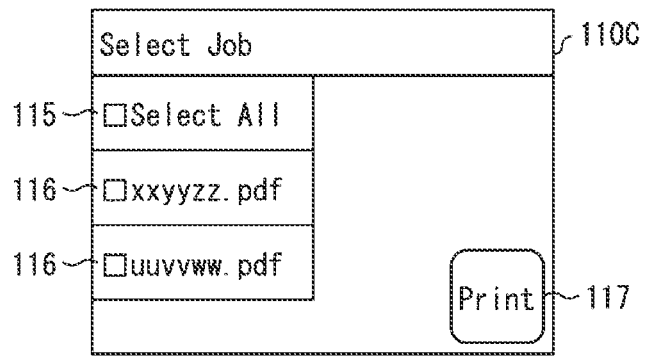

FIG. 12 is a diagram showing a transition of a display screen of an operation panel when the accumulation printing is performed.

Figure 13:
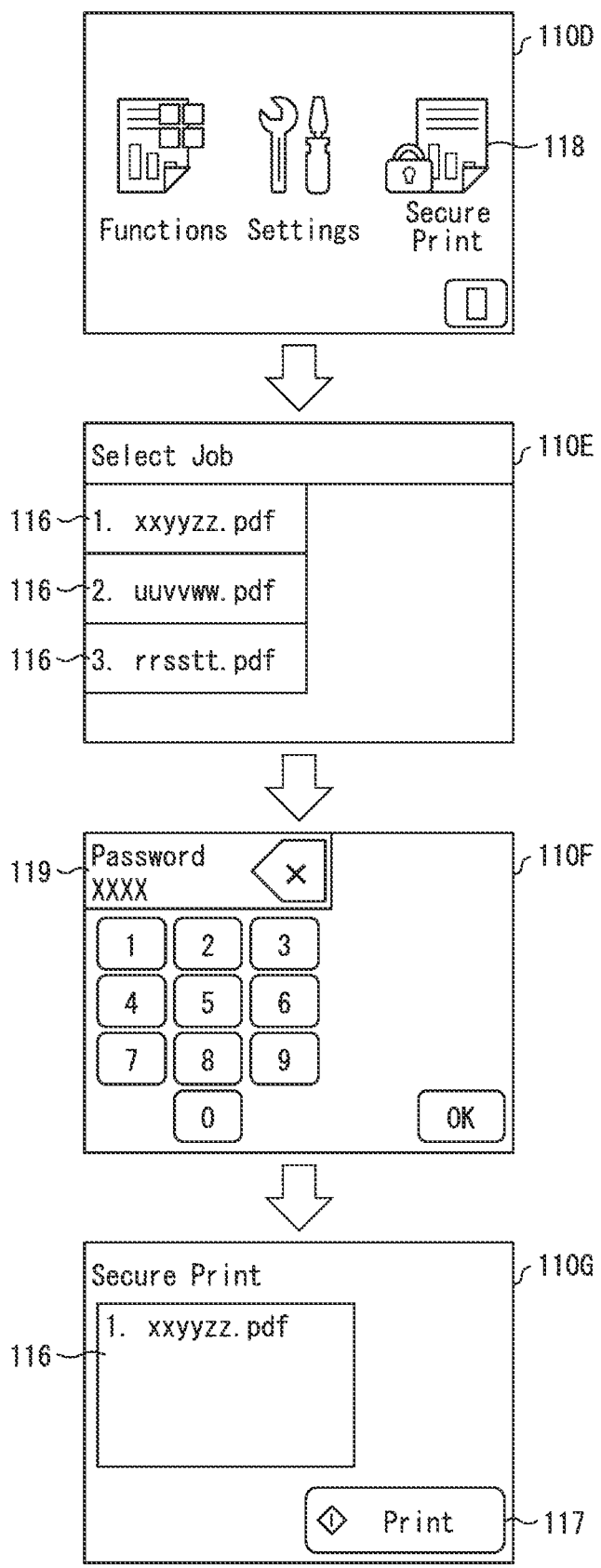

FIG. 13 is a diagram showing a transition of a display screen of the operation panel when secure printing is performed.

Hereinafter, a printing device 1 according to the present disclosure will be described with reference to FIGS. 1 to 13.

[Configuration of Printing System]

Figure 1:
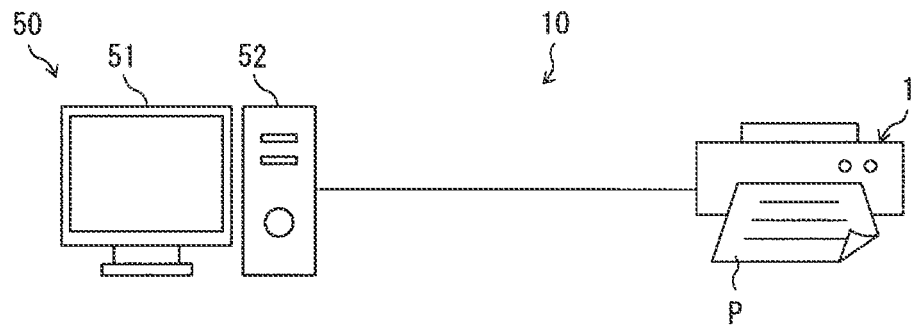
FIG. 1 is a block diagram showing a configuration of a printing system including a printing device according to the present disclosure.

FIG. 1 is a block diagram showing a configuration of a printing system 10 including the printing device 1 according to the present disclosure. As shown in FIG. 1, the printing system 10 includes the printing device 1 and an external device 50. The printing device 1 is a device for printing an image on a sheet, and is, for example, a multi-function peripheral (MFP).

The external device 50 is, for example, a personal computer (PC) and includes a display 51 and an external terminal 52. The display 51 is a device for displaying various settings of the printing device 1 or the like. The external device 50 is communicably connected to the printing device 1 via the external terminal 52. The external device 50 is used to instruct the printing device 1 to print on a sheet P.

The printing system 10 shown in FIG. 1 shows a configuration including one external device 50, but the present disclosure is not limited thereto. For example, the printing system 10 may include two or more external devices 50. In addition, the printing system 10 may include the external device 50 other than the PC, such as a smartphone or a tablet.

[Configuration of Printing Device]

Figure 2:
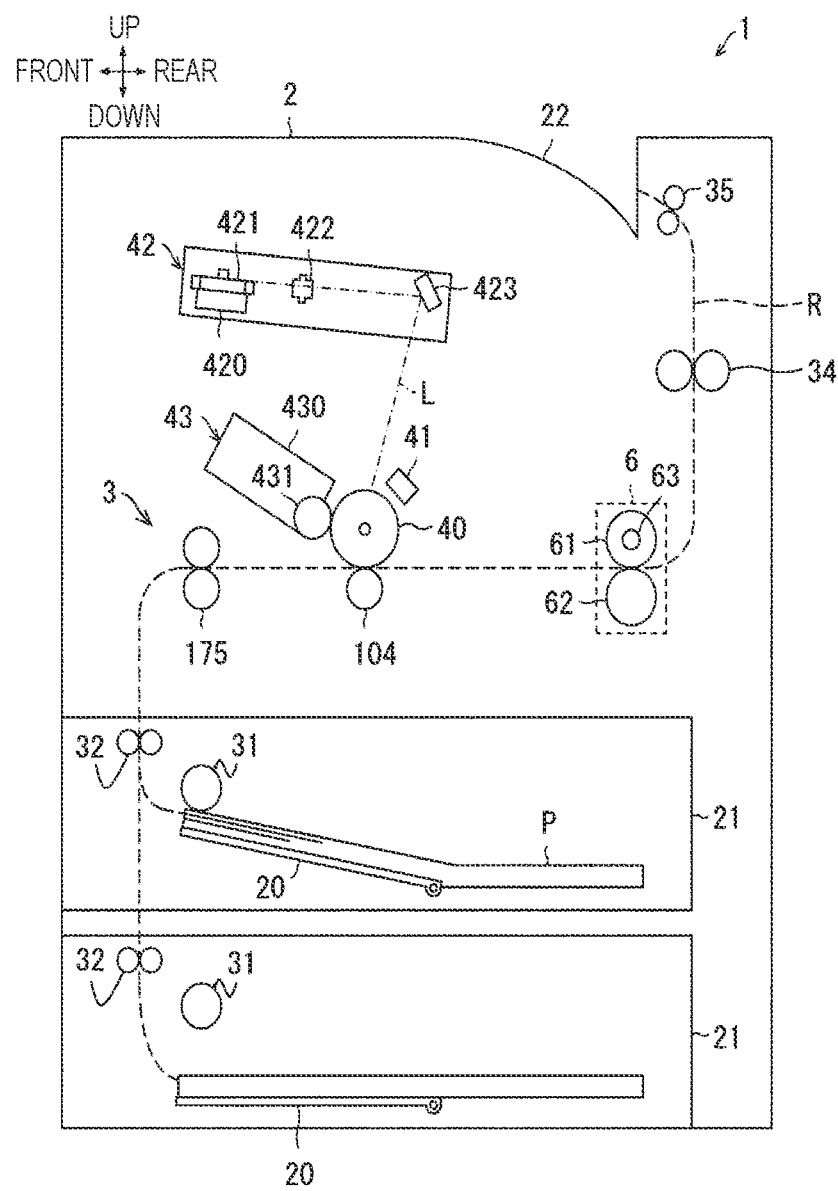
FIG. 2 is a diagram showing an example of an internal configuration of the printing device in FIG. 1.

Next, an internal configuration of the printing device 1 will be described in detail with reference to FIG. 2. FIG. 2 is a diagram showing an example of the internal configuration of the printing device 1. As shown in FIG. 2, the printing device 1 includes feed trays 21, a discharge tray 22, a conveying unit 3, and a print engine 4, in a housing 2.

Each feed tray 21 is detachably attached to a lower part of the housing 2 and supports the sheet P by a pressing plate 20. The discharge tray 22 is provided on an upper part of the housing 2 and supports the sheet P printed by the print engine 4. The sheet P is, for example, A4 size plain paper.

The conveying unit 3 includes feed rollers 31, conveying rollers 32, a registration roller 33, conveying rollers 34, and discharge rollers 35. The printing device 1 is provided with a conveyance path R for conveying the sheet P. The conveyance path R is a path from the feed tray 21 to the discharge tray 22 via the print engine 4 and a fixing device 6.

The feed roller 31 is provided on the feed tray 21. The feed roller 31 picks up the sheets P brought to the feed roller 31 one by one from the feed tray 21 as the pressing plate 20 rises, and feeds the sheets P to the conveyance path R.

The conveying rollers 32 convey the sheets P toward the registration roller 33. The registration roller 33 aligns positions of leading ends of the sheets P, and then conveys the sheets P toward the print engine 4. The print engine 4 prints on the sheets P conveyed by the conveying unit 3, based on print job data. The printed sheets P are discharged onto the discharge tray 22 by the conveying rollers 34 and the discharge rollers 35.

The print engine 4 is a device for printing on the sheet P by an electrophotographic method. The print engine 4 includes a photosensitive drum 40, a charger 41, an exposure device 42, a developer 43, a transfer roller 44, and the fixing device 6.

The photosensitive drum 40 is driven by a driving force from a motor that is not shown. The charger 41 is, for example, a scorotron charger, and is disposed facing the photosensitive drum 40. A charging bias is applied to the charger 41 by a charging bias application unit that is not shown. Thus, the charger 41 uniformly charges a surface of the photosensitive drum 40.

The exposure device 42 includes a polygon motor 420, a polygon mirror 421, a scanning lens 422, a reflecting mirror 423, a laser light source that is not shown, and the like. The polygon motor 420 is driven by the motor that is not shown and causes the polygon mirror 421 to rotate. The polygon mirror 421 deflects a laser beam L emitted from the laser light source to the surface of the photosensitive drum 40, via the scanning lens 422 and the reflecting mirror 423.

The exposure device 42 scans and exposes the surface of the photosensitive drum 40 with the laser beam L to form an electrostatic latent image based on the print job data on the surface of the photosensitive drum 40.

The developer 43 includes a toner accommodating portion 430 and a developing roller 431. The toner accommodating portion 430 accommodates toner. The developing roller 431 supplies the toner in the toner accommodating portion 430 to the electrostatic latent image formed on the surface of the photosensitive drum 40. Accordingly, a toner image is formed on the surface of the photosensitive drum 40.

The transfer roller 44 is disposed facing the photosensitive drum 40. A transfer forward bias is applied to the transfer roller 44 by a transfer bias application unit that is not shown. The transfer roller 44 transfers the toner image formed on the surface of the photosensitive drum 40 to the sheet P by conveying the sheet P while sandwiching the sheet P with the photosensitive drum 40.

The fixing device 6 includes a heating roller 61, a pressurizing roller 62, and a heater 63. The heating roller 61 heats the sheet P. The pressurizing roller 62 sandwiches the sheet P with the heating roller 61. The heater 63 is implemented by, for example, a halogen heater, is disposed inside the heating roller 61, and heats the heating roller 61.

The fixing device 6 causes the toner image formed on the sheet P to fix on the sheet P by conveying the sheet P, on which the toner image is formed, while sandwiching and heating the sheet P between the heating roller 61 and the pressurizing roller 62. Accordingly, the printing is performed with respect to the sheet P based on the print job data.

[Electrical Configuration of Printing Device]

Next, an electrical configuration of the printing device 1 will be described with reference to FIG. 3. FIG. 3 is a block diagram showing an example of the electrical configuration of the printing device 1. As shown in FIG. 3, the printing device 1 includes a controller 100, the print engine 4, the fixing device 6, an operation panel 110, and a communication interface (I/F) 150.

The controller 100 includes an application specification integrated circuit (ASIC) 102, a non-volatile random access memory (NVRAM) 103, and a random access memory (RAM) 104. The ASIC 102 includes a built-in central processing unit (CPU) 101. The ASIC 102, the NVRAM 103, the RAM 104, the print engine 4, the operation panel 110, and the communication I/F 150 are electrically connected to each other by a bus.

The controller 100 performs overall control of each unit of the printing device 1. The NVRAM 103 stores various control programs for controlling the printing device 1, various settings, and the like. The controller 100 controls the charger 41, the exposure device 42, and the developer 43 of the print engine 4, the fixing device 6, and the like based on the control programs stored in the NVRAM 103.

The RAM 104 is used as a work area in which the various control programs are read and a storage area in which image data is temporarily stored. The RAM 104 is provided with a buffer 104A and a page memory 104B.

The buffer 104A is a storage area for temporarily storing various commands and various pieces of data received by the communication I/F 150. For example, the print job data, a preceding command, and the like received from the external terminal 52 by the communication I/F 150 are temporarily stored in the buffer 104A.

The page memory 104B is a storage area for temporarily storing data generated by the controller 100. For example, accumulation job data generated from the print job data and the like are temporarily stored in the page memory 104B

The communication I/F 150 is connected to a network such as a local area network (LAN), and enables the printing device 1 to connect with the external terminal 52 of the external device 50 in which a driver for the printing device 1 is incorporated. The printing device 1 receives the various commands and the various pieces of data from the external terminal 52 via the communication I/F 150. The printing device 1 receives, for example, the preceding command and the print job data via the communication I/F 150.

The operation panel 110 is a configuration for accepting an operation of a user. The operation panel 110 includes a touch panel 111 and a push button 112. The touch panel 111 includes a display and an icon, displays an operation screen acquired from the controller 100 on the display, and outputs, to the controller 100, a signal representing a touch operation detected by the icon. The push button 112 includes a plurality of push buttons, and outputs, to the controller 100, a signal representing a push operation detected by each push button.

[Processing Performed by External Device]

Figure 4:
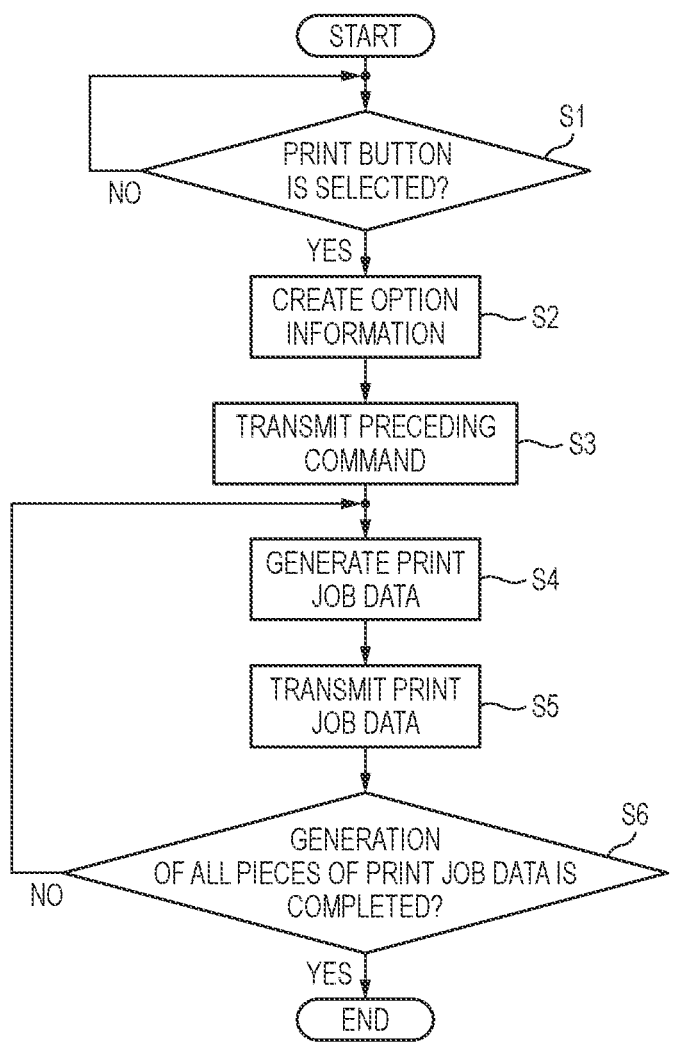
FIG. 4 is a flowchart showing an example of a processing flow of an external device in FIG. 1.

Next, a flow of processing performed by the external device 50 will be described with reference to FIG. 4. FIG. 4 is a flowchart showing an example of the flow of the processing performed by the external device 50 shown in FIG. 1.

In the flowchart shown in FIG. 4, first, the external device 50 determines whether a print button is selected by the user (step S1). The print button is displayed on the display 51 of the external device 50 and is a button for determining that the user performs desired printing.

The external device 50 returns to step S1 if the print button is not selected (step S1: NO), and creates option information (step S2) if the print button is selected (step S1: YES). In step S2, the external device 50 creates the option information indicating a specific print method in a print processing described later. The option information includes print setting information related to printing such as secure printing and accumulation printing, information specifying a size of the sheet P, information specifying a type of the sheet P, and the like.

After step S2, the external device 50 transmits the preceding command (step S3). In step S3, the external device 50 transmits the preceding command including the option information created in step S2 to the printing device 1 via the LAN that is not shown. It is assumed that the option information of the preceding command is described by, for example, a printer job language (PJL).

After step S3, the external device 50 generates the print job data (step S4). In step S4, the external device 50 generates the print job data including a print content and a print method in the print processing. It is assumed that the print content of the print job data is described by a page description language (PDL). In addition, it is assumed that the print method of the print job data is described in the printer job language.

Subsequently, the external device 50 transmits the print job data (step S5). In step S5, the external device 50 transmits the print job data generated in step S4 to the printing device 1 via the LAN.

Then, the external device 50 determines whether the generation of all pieces of the print job data is completed (step S6). The external device 50 repeats step S4 and step S5 for each page if the generation of all pieces of the print job data is not completed (step S6: NO), and ends the flow shown in FIG. 4 if the generation of all pieces of the print job data is completed (step S6: YES).

[Flow of Control Performed by Printing Device]

Figure 5:
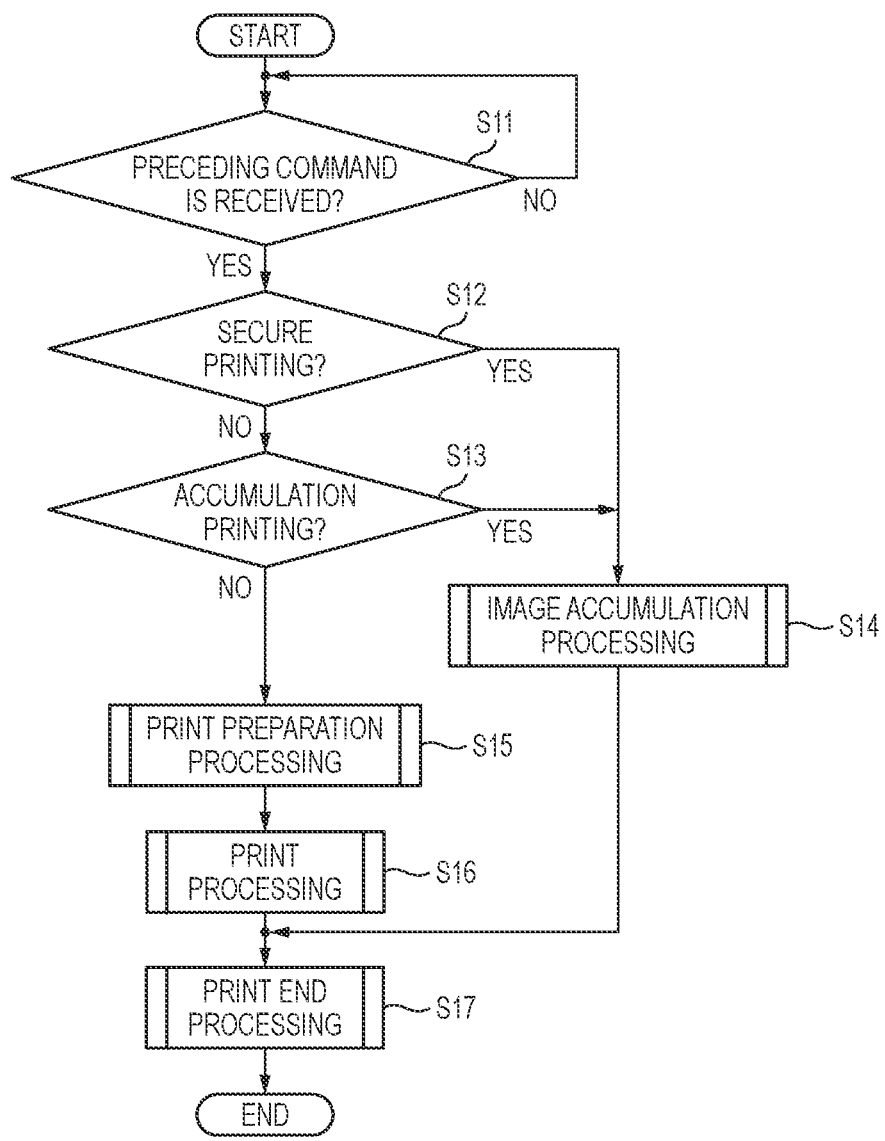
FIG. 5 is a flowchart showing an example of a control flow of the printing device in FIG. 3.

Next, a control flow of the printing device 1 will be described with reference to FIGS. 5, 10A, and 10B. FIG. 5 is a flowchart showing an example of the control flow of the printing device 1. FIGS. 10A and 10B are a timing chart showing an operation of each unit of the printing device 1 shown in FIG. 3. In FIGS. 10A and 10B, the printing device 1 is divided into the communication I/F 150, a PJL analysis unit, a RIP processing unit, an engine control unit, a motor control unit, and the fixing device 6, and processing performed by each unit is shown. The PJL analysis unit, the RIP processing unit, the engine control unit, and the motor control unit are functional blocks implemented by the controller 100.

As shown in FIG. 5, first, the controller 100 determines whether the preceding command is received via the communication I/F 150 (step S11). The preceding command is transmitted from the external terminal 52 prior to the print job data.

The controller 100 repeats step S11 if the preceding command is not received (step S11: NO), and determines whether the printing is secure printing (step S12) if the preceding command is received (step S11: YES). Here, the "secure printing" refers to a print setting in which the printing is started in a case where authentication information such as a password is input to the printing device 1.

In step S12, as shown in FIG. 10A, the controller 100 performs PJL analysis for analyzing a printer job description language, and determines that the printing is the secure printing in a case where the option information of the preceding command includes a secure printing flag.

In a case where some pieces of the information indicating the secure printing are included, in place of the secure printing flag, in the option information of the preceding command, it may be determined that the printing is the secure printing. For example, in a case where the password is included in the option information of the preceding command, it may be determined that the printing is the secure printing.

The preceding command is divided into a so-called command and the option information, and may be a command divided into a plurality of pieces of data transmitted from the external device 50.

If the controller 100 determines that the printing is the secure printing (step S12: YES), the processing proceeds to step S14. Meanwhile, if the controller 100 determines that the printing is not the secure printing (step S12: NO), the controller 100 determines whether the printing is accumulation printing (step S13). Here, the "accumulation printing" is a print setting in which the printing is not performed immediately after the print data job is received, and the printing of the print data job is started in a case where information permitting the printing of the print job data is input to the printing device 1.

In step S13, the controller 100 determines whether the print setting information indicating that the accumulation printing is ON is stored in the NVRAM 103 to determine whether the printing is accumulation printing. Here, as shown in FIG. 11, the user sets the accumulation printing ON on a display screen 110X of the operation panel 110. In a case where the operation panel 110 instructs that the accumulation printing is enabled, the controller 100 causes the NVRAM 103 of the printing device 1 to store the print setting information indicating that the accumulation printing is enabled. The method for setting the accumulation printing ON is not limited to the above. For example, the user may access a Web server included in the printing device 1 by using a browser included in the external device 50, and set the accumulation printing ON by an operation to a Web page provided by the Web server.

If the controller 100 determines that the printing is the accumulation printing (step S13: YES), the controller 100 performs an image accumulation processing (step S14) shown below.

<Image Accumulation Process>

Figure 6:
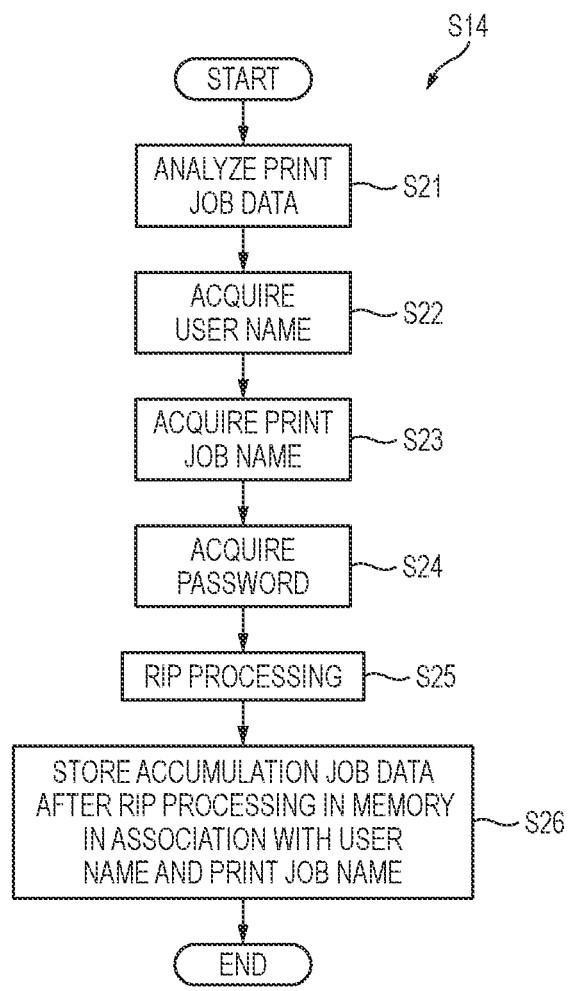
FIG. 6 is a flowchart showing an example of an image accumulation processing in FIG. 5.

Next, the image accumulation processing step S14 shown in FIG. 5 will be described with reference to FIG. 6. FIG. 6 is a flowchart showing an example of the image accumulation processing shown in FIG. 5. As shown in FIG. 6, in a case where the controller 100 receives the print job data transmitted in step S5 after step S3 from the external device 50, the controller 100 analyzes the received print job data (step S21). By analyzing the print job data, the controller 100 acquires a user name included in the print job data (step S22) and acquires a password (step S24). In a case where the print job data does not include the user name, the user name is not acquired in step S23. In a case where the print job data does not include the password, the password is not acquired in step S24.

After step S24, the controller 100 performs a RIP processing (step S25). In step S25, the controller 100 analyzes a PJL format data portion and a PDL format data portion of the print job data, and rasterizes the PDL format data to generate raster format accumulation job data representing an image to be printed on the sheet P.

The controller 100 stores the generated accumulation job data in the page memory 104B of the RAM 104. The accumulation job data is data for each page, and in a case where the print job data includes data of a plurality of pages, the controller 100 performs the RIP processing for all pieces of the print job data including data of the plurality of pages.

After step S25, the controller 100 stores the accumulation job data after the RIP processing in the page memory 104B of the RAM 104, in association with the user name and a print job name (step S26). In this way, the controller 100 ends the image accumulation processing.

<Accumulation Printing>

Next, an operation flow of the operation panel 110 in a case where the user performs the accumulation printing will be described with reference to FIG. 12. FIG. 12 is a diagram showing a transition of a display screen of the operation panel 110 in a case where the accumulation printing is performed.

As shown in FIG. 12, the user touch-operates an icon 113 for performing the accumulation printing, on a display screen 110A of the operation panel 110. Subsequently, the display screen is transited to a display screen 110B, and the user selects his/her user name on the display screen 110B. Accordingly, only the accumulation job data stored in association with the selected user name can be extracted, and a list of job names of the extracted accumulation job data is displayed on a display screen 110C.

After that, the display screen is transited to the display screen 110C, and the user selects, on the display screen 110C, print job name 116 to be printed. Here, the user name and the print job name correspond to identification information of the accumulation job data. The user selects an icon 115 in a case of selecting all pieces of the accumulation job data displayed on the display screen 110C.

Then, the user selects an icon 117 for performing the printing. Accordingly, the identification information of the accumulation job data and a print instruction are input from the operation panel 110 to the controller 100. In response to this, the controller 100 copies the selected accumulation job data to a print queue. In a case where the accumulation job data is copied to the print queue, the print engine 4 performs a print preparation processing. Then, the controller 100 cause the print engine 4 to performs the print processing of printing the accumulation job data, and then performs a print end processing.

The controller 100 may copy, to the print queue, all pieces of the accumulation job data extracted by selecting the user name on a display screen B without displaying the extracted accumulation job data on the display screen 110C.

<Print Preparation Process>

Figure 7:
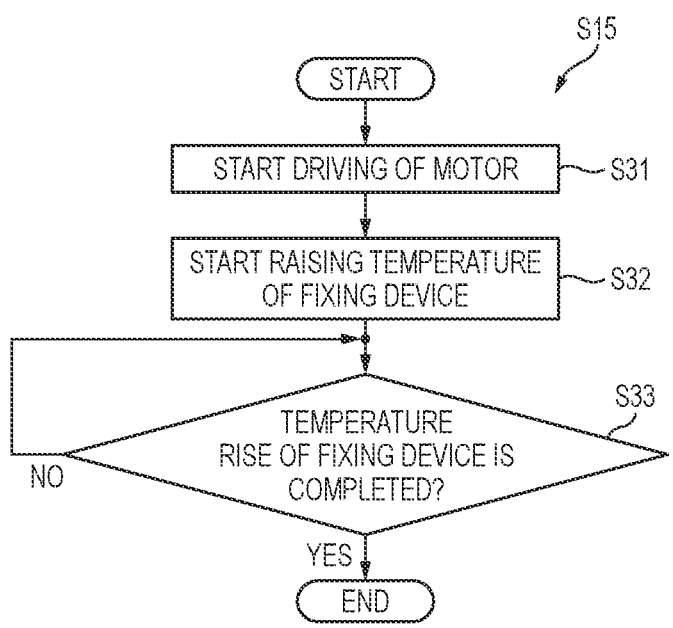
FIG. 7 is a flowchart showing an example of a print preparation processing in FIG. 5.

FIG. 7 is a flowchart showing an example of the print preparation processing. In the flowchart shown in FIG. 7, first, the controller 100 causes a motor 60 to start driving (step S31), causes the heating roller 61 to start rotating, and sets a rotation speed of the heating roller 61 to a predetermined rotation speed.

After step S31, the controller 100 cause the heater 63 to heat the heating roller 61 to start raising a temperature of the fixing device 6 (step S32). Then, the controller 100 determines whether the temperature rise of the fixing device 6 is completed (step S33). Specifically, the controller 100 determines, in step S33, whether the temperature of the fixing device 6 detected by a temperature sensor that is not shown reaches a predetermined temperature, for example, 150° C., or higher.

If the temperature rise of the fixing device 6 is not completed (step S33: NO), the controller repeats step S33, and if the temperature rise of the fixing device 6 is completed (step S33: YES), the controller 100 ends the print preparation processing shown in FIG. 7.

In the print preparation processing step S15, the controller 100 may perform, as print preparation operations, a cleaning operation of collecting the toner adhering to the photosensitive drum 40 by a cleaner that is not shown, and an operation of stirring the toner accommodated in the toner accommodating portion 430 by an agitator that is not shown.

<Print Process>

Figure 8:
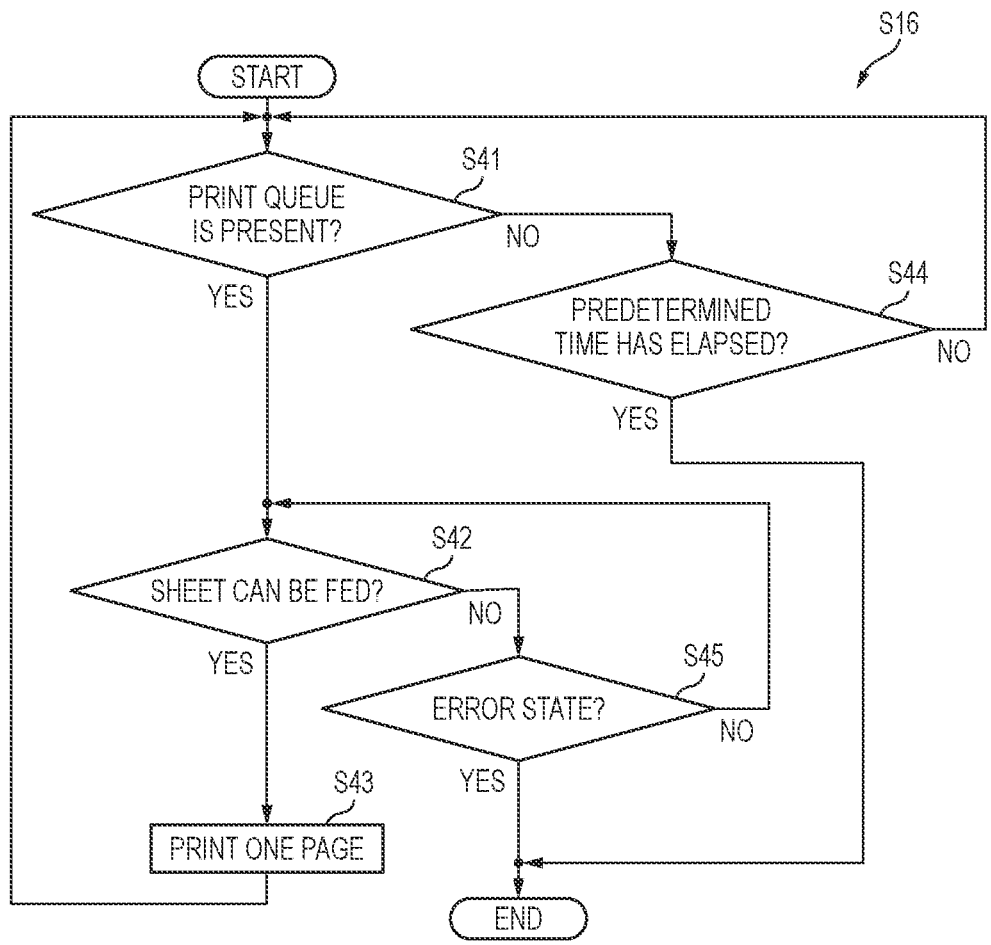
FIG. 8 is a flowchart showing an example of a print processing in FIG. 5.

FIG. 8 is a flowchart showing an example of the print processing. In the flowchart shown in FIG. 8, the controller 100 determines whether the accumulation job data is stored in the page memory 104B of the RAM 104 (step S41).

If the accumulation job data is stored in the page memory 104B (step S41: YES), the controller 100 determines whether the sheet P can be fed (step S42). If the controller 100 determines that the sheet P can be fed (step S42: YES), the controller 100 cause the print engine 4 to print, on the sheet P, an image expressed by the accumulation job data of one page (step S43).

After step S43, the controller 100 deletes the accumulation job data whose printing is completed from the page memory 104B, returns to step S41, and determines whether the accumulation job data is left in the page memory 104B.

Meanwhile, if the accumulation job data is not stored in the page memory 104B (step S41: NO), the controller 100 determines whether a predetermined time has elapsed (step S44). If the predetermined time has not elapsed (step S44: NO), the controller 100 returns to step S41, and if the predetermined time has elapsed (step S44: YES), the controller 100 ends the print processing step S16 without printing on the sheet P.

If the controller 100 determines that the sheet P cannot be fed (step S42: NO) and an error state is not detected (step S45: NO), the controller 100 returns to step S42, and if the error state is detected (step S45: YES), the controller 100 ends the print processing step S16 without printing on the sheet P.

<Print End Process>

Figure 9:
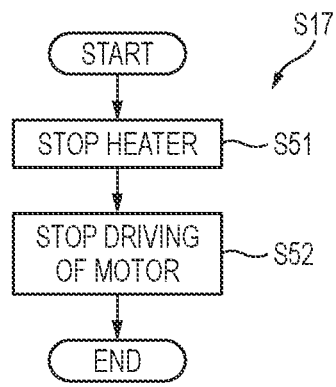
FIG. 9 is a flowchart showing an example of a print end processing in FIG. 5.

FIG. 9 is a flowchart showing an example of the print end processing. In the flowchart shown in FIG. 9, the controller 100 causes the heater 63 to stop (step S51), stops heating of the fixing device 6, causes the motor 60 to stop driving (step S52), and causes the heating roller 61 to stop rotating.

<Secure Printing>

Next, an operation flow of the operation panel 110 in a case where the user performs the secure printing will be described with reference to FIG. 13. FIG. 13 is a diagram showing a transition of a display screen of the operation panel 110 in a case where the secure printing is performed.

As shown in FIG. 13, the user first touch-operates an icon 118 for performing the secure printing on a display screen 110D of the operation panel 110. Subsequently, the display screen is transited to a display screen 110E, and the user selects, on the display screen 110E, the print job name 116 to be printed. Here, the user name and the print job name correspond to the identification information of the accumulation job data.

Next, the user inputs a password to the icon 119 on a display screen 110F. Then, in a case where the input password matches the password of the selected accumulation job data, the controller 100 displays a display screen 110G. Meanwhile, in a case where the input password does not match the password of the selected accumulation job data, the controller 100 displays an error on the operation panel 110 and accepts the password input again.

After that, the display screen is transited to the display screen 110G, and the user confirms the print job name 116 to be printed, and selects the icon 117 for performing the printing, on the display screen 110G. Accordingly, the identification information and the authentication information of the accumulation job data, and the print instruction are input from the operation panel 110 to the controller 100.

In response to this, the controller 100 copies the selected accumulation job data to the print queue. In a case where the accumulation job data is copied to the print queue, the controller 100 cause the print engine 4 to performs the print preparation processing. Then, the controller 100 cause the print engine 4 to performs the print processing of printing the accumulation job data, and then performs the print end processing.

Meanwhile, if the controller 100 determines that the printing is not the accumulation printing (step S13: NO), the controller 100 performs the print preparation processing (step S15), performs the print processing (step S16), and then performs the print end processing (step S17). Here, in the print processing (step S16), the controller 100 cause the print engine 4 to print the print job data transmitted by the external device 50 in step S5 after step S3. That is, the controller 100 replaces the accumulation job data in the description of the above-described <Print Process> with the print job data, and performs the same processing as the above-described <Print Process>.

According to the printing device 1 of the present disclosure described above, if the printing is set to the secure printing (step S12: YES), or set to the accumulation printing (step S13: YES), the print preparation processing (step S15) is not performed, and thus an unnecessary print preparation operation (step S15) can be prevented and energy can be saved. The print preparation operation is prevented from being unnecessarily continued, and the user comfort can be improved.

OTHER EMBODIMENTS

In the above-described embodiment, the print engine 4 prints by an electrophotographic method, but the printing is not limited thereto, and the printing may be performed by an inkjet method.

In the above-described embodiment, the data in which the print content is described in the PDL format is targeted, but examples of the PDL format include a portable document format (PDF), a printer control language (PCL) format, an XML, paper specification (XPS) format, and a post script (PS) format. In addition, the present disclosure is not limited thereto, and data described in a format different from the PDL format may be targeted.

The present disclosure is not limited to the embodiments described above, various modifications can be made within the scope of the claims, and embodiments obtained by appropriately combining technical methods disclosed in different embodiments are also included in the technical scope of the present disclosure.

What is claimed is:

1. A printing device comprising:
a communication interface configured to communicate with an external device;
a user interface for inputting a print instruction; and
a controller configured to:
receive print setting information related to printing, the print setting information being transmitted from the external device;
determine whether or not the printing is set to accumulation printing, based on the received print setting information, the accumulation printing being a printing method in which the controller is configured to store print job data received from the external device in the printing device and to print the print job data stored in the printing device in response to receipt of the print instruction by the user interface;
perform the printing, in a case where it is determined that the printing is not set to the accumulation printing, the printing being a processing of printing on a sheet based on the print job data; and
perform a print preparation processing of performing a predetermined preparation operation before printing, in a case where it is determined that the printing is not set to the accumulation printing,
wherein the controller is configured to accumulate the print job data without performing the print preparation processing, in a case where it is determined that the printing is set to the accumulation printing.

2. The printing device according to claim 1, further comprising:
a first memory,
wherein the printing includes the accumulation printing in which the controller is configured to store print job data received from the external device in the first memory, and to print in response to an input of authentication information,
the controller is configured to:
receive a preceding command transmitted from the external device prior to the print job data;
determine that the printing is set to the accumulation printing, in a case where the received preceding command includes a flag related to the first accumulation printing as the print setting information; and
perform the print preparation processing of performing the predetermined preparation operation before printing, in a case where it is determined that the printing is not set to the accumulation printing, and
the controller is configured to accumulate the print job data without performing the print preparation processing, in a case where it is determined that the printing is set to the accumulation printing.

3. The printing device according to claim 2, further comprising:
a second memory in which the controller is configured to store accumulation job data generated based on the print job data,
wherein the controller is configured to:
generate accumulation job data based on the print job data and store, in the second memory, the accumulation job data in association with identification information of the print job data, without performing the print preparation processing, in a case where it is determined that the printing is set to the accumulation printing, the accumulation job data corresponding to the preceding command including the flag; and
print the accumulation job data in response to an input of the authentication information.

4. The printing device according to claim 1, further comprising:
a memory,
wherein the printing includes the accumulation printing in which the controller is configured to store print job data received from the external device in the memory and to print the print job data stored in the memory in response to receipt of a print instruction, the printing instruction not including an input of authentication information,
the controller is configured to:
store, in the memory, print setting information indicating that the accumulation printing is enabled, in a case where it is instructed to enable the accumulation printing;
determine that the printing is set to the accumulation printing, in a case where the print setting information indicating that the accumulation printing is enabled is stored in the memory; and perform the print preparation processing of performing the predetermined preparation operation before printing, in a case where it is determined that the printing is not set to the accumulation printing, and the controller is configured to accumulate the print job data without performing the print preparation processing, in a case where it is determined that the printing is set to the accumulation printing.

5. The printing device according to claim 4, wherein the controller is configured to:
   generate accumulation job data based on the print job data and store, in the memory, the accumulation job data in association with identification information included in the print job data, without performing the print preparation processing, in a case where it is determined that the printing is set to the accumulation printing; and
   print the print job data in response to an input of the identification information.

6. The printing device according to claim 5, wherein the identification information is a user name.

7. The printing device according to claim 1, comprising:
   a print engine configured to print on a sheet,
   wherein the controller is configured to:
      cause the print engine to print on the sheet in response to receipt of an instruction to perform the accumulation printing from the user interface, in a case where it is determined that the printing is set to the accumulation printing.

8. The printing device according to claim 1, further comprising:
   a fixing device that includes a heating roller and a heater,
   wherein the controller is configured to:
      in the print preparation processing, cause the heating roller to rotate and the heater to heat the fixing device, as the preparation operation.

\* \* \* \* \*